United States Patent
Shimoda et al.

(10) Patent No.: US 11,174,950 B2
(45) Date of Patent: Nov. 16, 2021

(54) MOUNTING STRUCTURE FOR MOUNTING VALVE PLATE TO VALVE ROD IN GATE VALVE, AND GATE VALVE HAVING MOUNTING STRUCTURE

(71) Applicant: SMC CORPORATION, Chiyoda-ku (JP)

(72) Inventors: Hiromi Shimoda, Noda (JP); Hiroshi Ogawa, Okegawa (JP); Takashi Nagao, Abiko (JP); Tsuyoshi Ochi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/905,299

(22) Filed: Jun. 18, 2020

(65) Prior Publication Data

US 2020/0400238 A1 Dec. 24, 2020

(30) Foreign Application Priority Data

Jun. 19, 2019 (JP) .............................. JP2019-113993

(51) Int. Cl.
*F16K 3/18* (2006.01)
*F16K 51/02* (2006.01)
*F16K 3/02* (2006.01)

(52) U.S. Cl.
CPC .............. *F16K 3/184* (2013.01); *F16K 51/02* (2013.01); *F16K 3/0218* (2013.01)

(58) Field of Classification Search
CPC .......... F16K 51/02; F16K 3/186; F16K 3/184; F16K 3/0218; F16K 1/487
See application file for complete search history.

(56) References Cited

U.S. PATENT DOCUMENTS

| 7,100,892 B2 * | 9/2006 | Iwabuchi ................ F16K 3/184 |
| | | 251/187 |
| 7,134,642 B2 * | 11/2006 | Seitz ........................ F16K 3/18 |
| | | 251/193 |

(Continued)

FOREIGN PATENT DOCUMENTS

JP 2005-291221 A 10/2005

OTHER PUBLICATIONS

Extended European Search Report dated Oct. 21, 2020 in European Patent Application No. 20178027.7, 8 pages.

*Primary Examiner* — David Colon-Morales
(74) *Attorney, Agent, or Firm* — Oblon, McClelland, Maier & Neustadt, L.L.P.

(57) ABSTRACT

A spacer having a wedge-shaped flat plate portion and an engagement protrusion is interposed between a hole end surface of mounting hole of a valve plate and a rod end surface of mounting portion of a valve rod, which thereby forms a wedge-shaped gap between the spacer and the hole end surface so as to open frontward. A fastening force of a valve-plate fixation screw generates a moment M that deforms the valve plate in a direction of narrowing the gap. At the same time, the engagement protrusion of the spacer is pressed into a wedge-shaped space between the inclined surface portion of the rod end surface and the rear hole-wall surface of the mounting hole, which causes the front hole-wall surface of mounting hole of the valve plate to press the rod front surface of mounting portion of the valve rod.

6 Claims, 13 Drawing Sheets

(56) References Cited

U.S. PATENT DOCUMENTS

| | | | | |
|---|---|---|---|---|
| 8,511,642 | B2* | 8/2013 | Schoch | F16K 51/02 |
| | | | | 251/327 |
| 8,657,257 | B2* | 2/2014 | Shimoda | F16K 51/02 |
| | | | | 251/329 |
| 8,678,344 | B2* | 3/2014 | Ehrne | F16K 3/314 |
| | | | | 251/87 |
| 10,253,889 | B2* | 4/2019 | Ishigaki | F16K 51/02 |
| 10,876,639 | B2* | 12/2020 | Shimoda | F16K 1/487 |
| 2011/0095218 | A1 | 4/2011 | Schoch et al. | |
| 2011/0108750 | A1 | 5/2011 | Ehrne et al. | |
| 2016/0363240 | A1* | 12/2016 | Wagner | F16K 3/0218 |

* cited by examiner

MOUNTING STRUCTURE FOR MOUNTING VALVE PLATE TO VALVE ROD IN GATE VALVE, AND GATE VALVE HAVING MOUNTING STRUCTURE

TECHNICAL FIELD

The present invention relates to a mounting structure for mounting a valve plate onto an end of a valve rod in a gate valve and also relates to the gate valve having the mounting structure for mounting the valve plate.

BACKGROUND ART

A gate valve is used in a microchip processing apparatus to open and close an opening that communicates with a vacuum chamber. The gate valve is configured such that a valve plate attached to an end of the valve rod is accommodated in a valve box mounted on a vacuum chamber and the valve plate opens and closes the opening formed in a side wall of the valve box. The opening is closed by pressing a sealing member attached to the valve plate against a valve seat formed around the opening.

For example, a gate valve disclosed in PTL 1 is configured such that an upper wall is detachably mounted on a valve box and a valve plate is fixed with screws to the top end of a valve rod in the axial direction thereof. This enables the valve plate to be detached from the valve rod by operation outside the valve box, which facilitates gate valve maintenance. In the gate valve, the valve plate is attached to the valve rod so as to rotate about the axis of the valve rod. Accordingly, when the valve plate is pressed against the valve seat, the valve plate rotates so as to follow the valve seat, which enables a sealing face (sealing member) of the valve plate to press the valve seat evenly.

Recent trend of miniaturization and higher integration of microchips accelerates the reduction in the line width of microchip. It is strongly demanded to reduce particle generation in microchip processing as much as possible to a level close to zero.

The gate valve disclosed in PTL 1, however, has a problem that the valve plate is rubbed against the valve rod or against the valve seat and particles tend to be generated when the gate valve is in operation. To suppress particle generation, it is necessary to fix the valve plate to the valve rod securely and accurately.

CITATION LIST

Patent Literature

[PTL 1] Japanese Unexamined Patent Application Publication No. 2005-291221

SUMMARY OF INVENTION

Technical Problem

In the present invention, a technical problem is to suppress particle generation during gate valve operation by fixing a valve plate to a valve rod reliably and accurately.

Solution to Problem

To solve the above problem, the present invention provides a mounting structure for mounting a valve plate onto a valve rod in a gate valve. The gate valve is configured such that the valve plate attached to an end of the valve rod that extends in an up-down direction is accommodated in a valve box and the valve plate opens and closes a gate opening formed in a side wall of the valve box. In the mounting structure, the valve plate includes a valve front surface to which a sealing member for coming into contact with and being separated from a valve seat disposed around the gate opening is attached, a valve rear surface positioned on a side opposite to the valve front surface, a valve upper surface, and a valve lower surface. The valve plate has a mounting hole that is formed in the valve lower surface and into which a mounting portion formed at the end of the valve rod is to be inserted. The valve plate also has a screw insertion hole that penetrates the valve plate between the valve upper surface and the mounting hole and through which a valve-plate fixation screw is to be inserted. In addition, the valve plate is attached to the valve rod by the valve-plate fixation screw. The mounting hole is defined by a front hole-wall surface positioned near the valve front surface, a rear hole-wall surface positioned near the valve rear surface, and a hole end surface that is a bottom surface of the mounting hole. The screw insertion hole opens at the hole end surface. The mounting portion of the valve rod has a rod front surface that opposes the front hole-wall surface of the mounting hole, a rod rear surface that opposes the rear hole-wall surface of the mounting hole, and a rod end surface positioned at an end of the mounting portion. The rod end surface has a threaded hole formed so as to be screwed with the valve-plate fixation screw to be inserted through the screw insertion hole of the valve plate. In a state in which the mounting portion of the valve rod is inserted into the mounting hole of the valve plate until the rod end surface abuts a hole end and in a state in which the valve-plate fixation screw is not screwed with the threaded hole, a horizontally elongated gap is formed between the hole end surface of the mounting hole and the rod end surface of the valve rod, and the gap opens at a position near the rod front surface of the mounting portion and closes at a position closer to the rod rear surface with respect to a central axis of the threaded hole. The front hole-wall surface of the valve plate is configured to press the rod front surface of the valve rod by tightening the valve-plate fixation screw when the valve-plate fixation screw is screwed with the threaded hole.

In the present invention, the gap is preferably shaped like a wedge in such a manner that an opening width of the gap in the up-down direction is gradually narrowed from the rod front surface toward the rod rear surface.

In a specific example according to the present invention, a spacer is provided between the hole end surface of the mounting hole and the rod end surface of the mounting portion. The spacer has an upper surface to abut the hole end surface and a lower surface to abut the rod end surface and also has a through hole that is formed between the upper surface and the lower surface and through which the valve-plate fixation screw is inserted. The gap is formed between the upper surface of the spacer and the hole end surface of the mounting hole, and the gap opens at a position near the rod front surface of the mounting portion and closes at a position closer to the rod rear surface with respect to the through hole when the upper surface of the spacer abuts the hole end surface of the mounting hole.

In this case, the upper surface and the lower surface of the spacer are preferably flat surfaces. Moreover, the spacer has a flat plate portion between the upper surface and the lower surface, a front edge near the rod front surface, and a rear edge near the rod rear surface. The flat plate portion is shaped like a wedge in such a manner that a thickness between the upper surface and the lower surface gradually increases from the front edge toward the rear edge, and the gap is shaped like a wedge in such a manner that the gap gradually becomes narrower from the front edge toward the rear edge.

It is more preferable that the spacer have an engagement protrusion formed at the rear edge so as to protrude downward. The engagement protrusion has a first surface extending downward from the rear edge and a second surface extending downward from a rear end of the lower surface, and the engagement protrusion is shaped like a wedge in such a manner that a width of the engagement protrusion in a front-rear direction gradually decreases toward a lower end thereof. The rod end surface of the mounting portion has an uninclined surface portion that extends from a front edge of the mounting portion toward a rear edge thereof so as to orthogonally intersects the central axis. The rod end surface also has an inclined surface portion that extends from a rear end of the uninclined surface portion toward a base end of the mounting portion and declines such that a width of the mounting portion in the front-rear direction increases gradually. In the state in which the valve-plate fixation screw is screwed tightly with the threaded hole and the valve plate is thereby fixedly mounted on the mounting portion of the valve rod, the engagement protrusion of the spacer is pressed in between the rear hole-wall surface of the mounting hole and the inclined surface portion of the rod end surface, which causes the first surface of the engagement protrusion to press the rear hole-wall surface and also causes the second surface of the engagement protrusion to press the inclined surface portion. It is even more preferable that in the spacer, the first surface of the engagement protrusion form an acute angle with the upper surface of the flat plate portion and also form a right angle with the lower surface of the flat plate portion.

In a specific example according to the present invention, the valve-plate fixation screw more preferably has a screw body to be screwed with the threaded hole and a manipulation-purpose screw head connected to a base end of the screw body. The screw body has an external thread portion having a thread formed on a circumferential surface thereof and a column-like shaft formed closer to the base end of the screw body with respect to the external thread portion. The threaded hole is formed of an internal thread section in which a thread to be screwed with the external thread portion is formed on an inner peripheral surface of the threaded hole. The threaded hole is also formed of a cylindrical section that has a circular cross section and is positioned closer to the rod end surface with respect to the internal thread section. A thread to be screwed with the external thread portion of the valve-plate fixation screw is formed on an inner peripheral surface of the through hole of the spacer. In a direction of the central axis, a length of the external thread portion of the valve-plate fixation screw is made shorter than a length of the cylindrical section of the threaded hole.

The present invention provides a gate valve configured such that a valve plate attached to an end of the valve rod that extends in an up-down direction is accommodated in a valve box and the valve plate opens and closes a gate opening formed in a side wall of the valve box in which the valve plate is attached to the valve rod by using the mounting structure.

Advantageous Effects of Invention

According to the present invention, in a state in which the mounting portion of the valve rod is inserted into the mounting hole of the valve plate until the rod end surface abuts a hole end, and in a state in which the screw body of the valve-plate fixation screw is not screwed with the threaded hole at the rod end surface, a horizontally elongated gap is formed between the hole end surface of the mounting hole and the rod end surface of the valve rod, and the gap opens at a position near the rod front surface of the mounting portion and closes at a position near the rod rear surface with respect to a central axis of the threaded hole.

When the valve plate is fixedly mounted on (or joined to) the mounting portion of the valve rod by screwing the valve-plate fixation screw tightly with the threaded hole, a fastening force generated by tightening the valve-plate fixation screw acts on the valve plate so as to narrow the gap and generates a moment that causes the front hole-wall surface of the valve plate to press the rod front surface of the valve rod. Thus, the valve plate can be fixed to the valve rod firmly and accurately, and generation of particles due to the valve plate rubbing against the valve rod can be suppressed.

DESCRIPTION OF EMBODIMENTS

Figure 1:
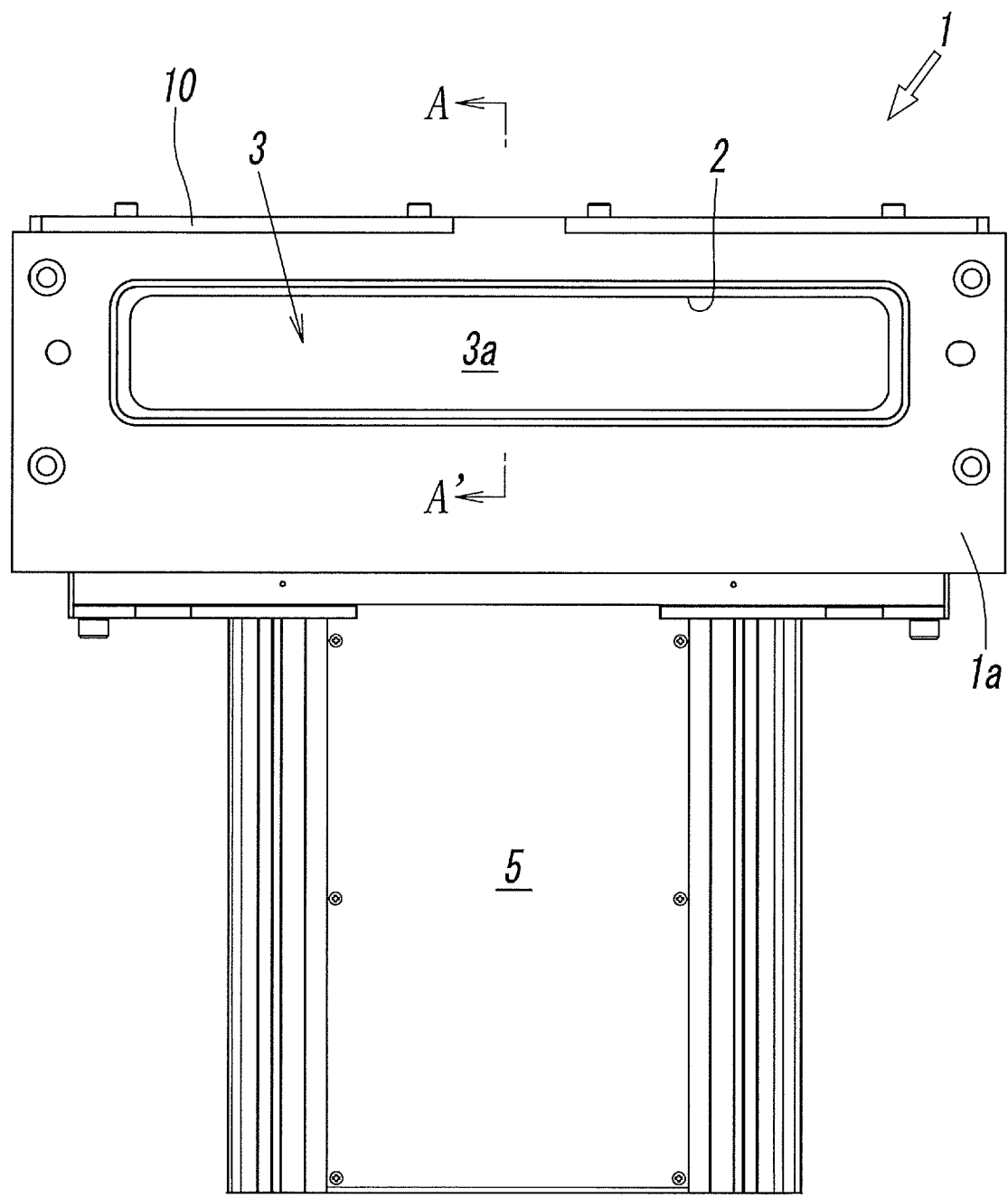
FIG. 1 is a front view illustrating a gate valve to which the present invention is applied.
Figure 2:
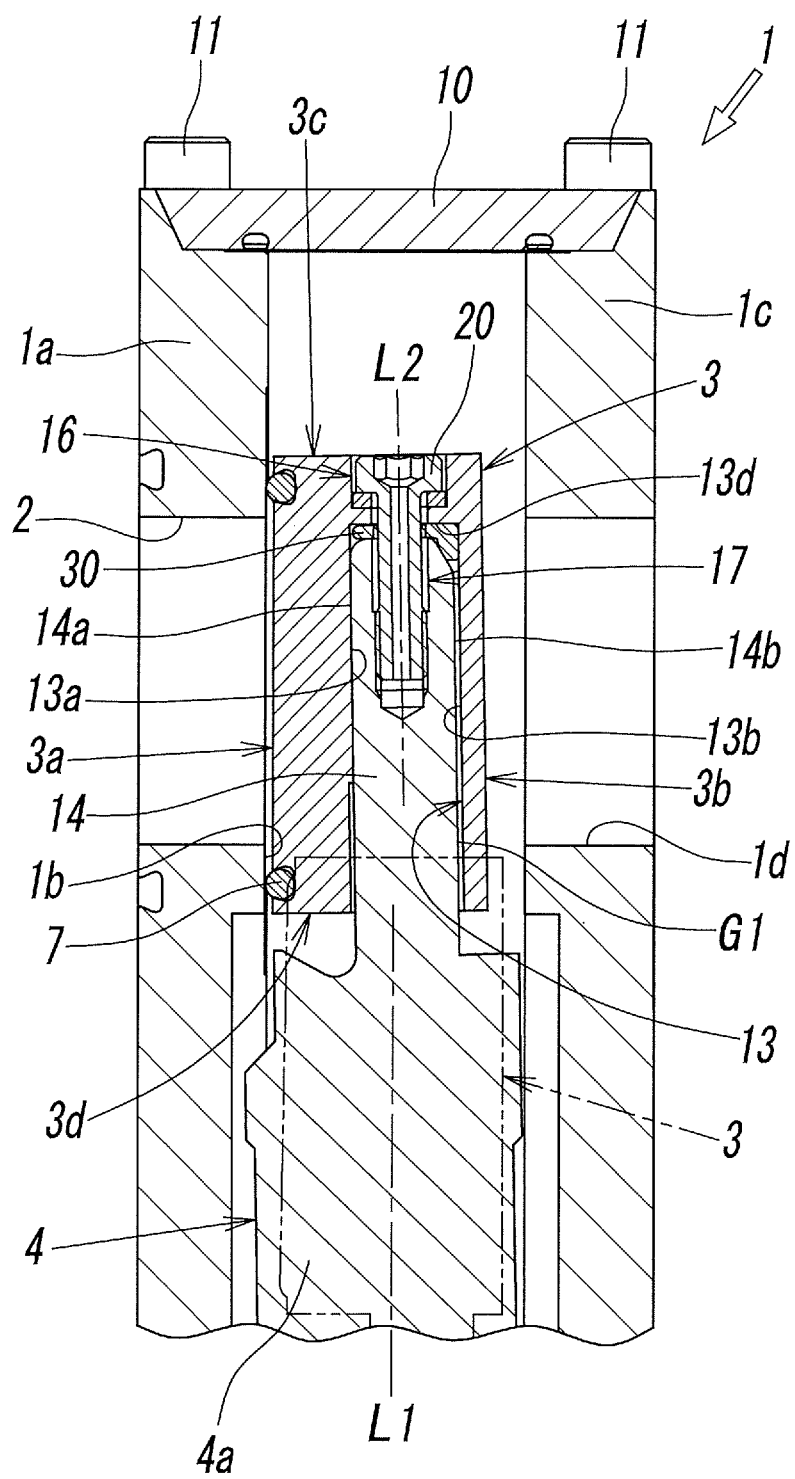
FIG. 2 is an enlarged cross-sectional view illustrating part of the gate valve taken along line A-A' in FIG. 1.
Figure 3:
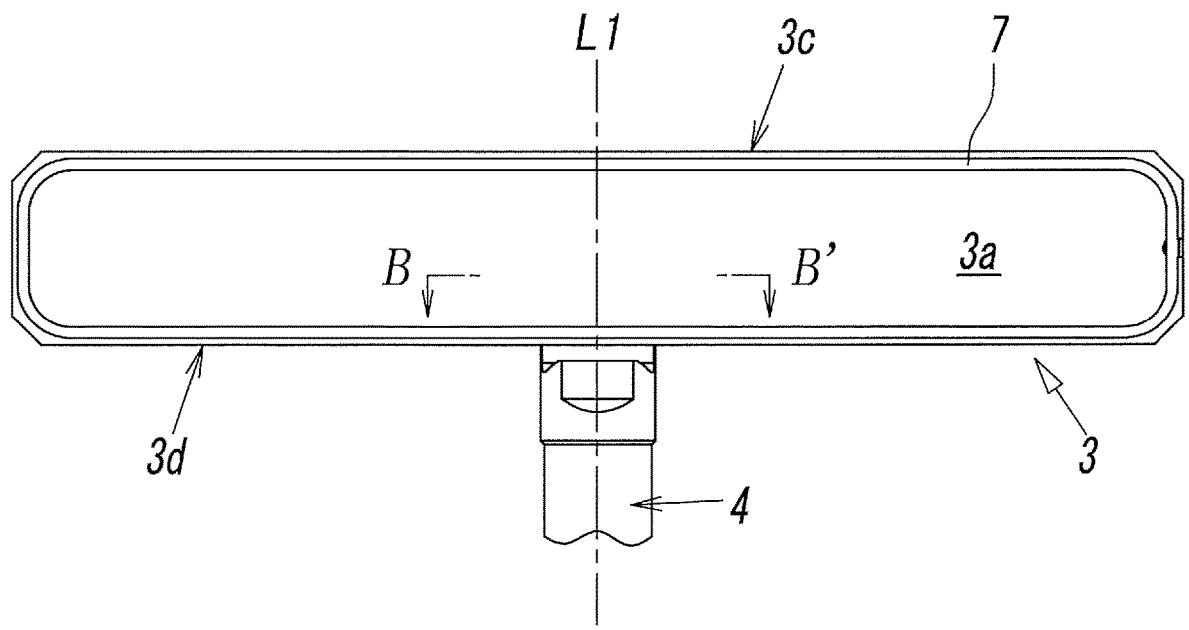
FIG. 3 is a front view illustrating a valve plate.

FIG. 1 and FIG. 2 illustrate an embodiment of a gate valve in which a mounting structure according to the present invention is applied to a valve rod 4 and a valve plate 3 to be mounted onto the valve rod 4. In use, the gate valve is fitted to an opening of a vacuum chamber (not illustrated). The gate valve includes a valve box 1, a valve plate 3, valve rod 4, and a valve actuator 5. The valve box 1 has a gate opening 2 to communicate with the opening of the vacuum chamber. The valve plate 3 is accommodated in the valve box 1 and configured to open and close the gate opening 2. The valve rod 4 having an axis L1 is attached to the valve plate 3 for opening and closing operation, and the valve actuator 5 moves the valve rod 4.

The gate valve is configured such that as illustrated in FIG. 2, the valve actuator 5 moves the valve rod 4 and thereby moves the valve plate 3 reciprocally between a close position, indicated by the solid line, at which the gate opening 2 is closed and an open position (retracted position), indicated by the dash-dot-dot line, at which the gate opening 2 is open. The valve actuator 5 has a driving mechanism constituted by an air cylinder, a cam mechanism, and other parts. The descriptions of these are omitted here since the structure and operation of the valve actuator 5 are well known.

The valve box 1 has an external shape of a laterally elongated cuboid, which is formed into a hollow box having front and rear side walls 1a and 1c. The front side wall 1a is connected to the vacuum chamber. The gate opening 2 shaped like a laterally elongated rectangle is formed in the front side wall 1a. A flat valve seat 1b is also formed in the front side wall 1a so as to surround the gate opening 2. The gate valve is configured such that at the close position, a sealing member 7 attached to the front surface of the valve plate 3 is pressed against the valve seat 1b by the valve actuator 5 to close the gate opening 2.

Figure 10:
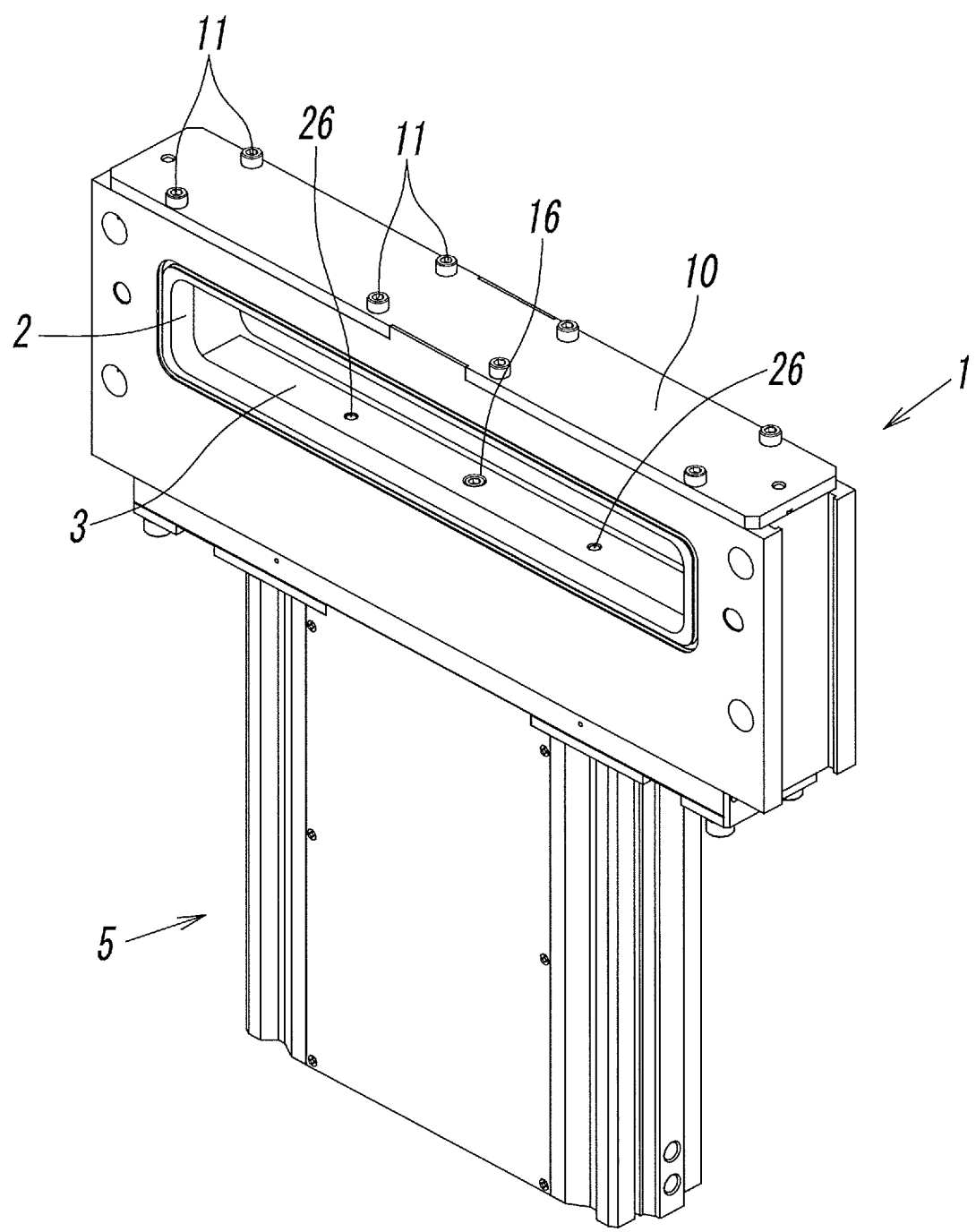
FIG. 10 is a perspective view illustrating the gate valve in a state in which the valve plate is retracted to a retracted position.
Figure 11:
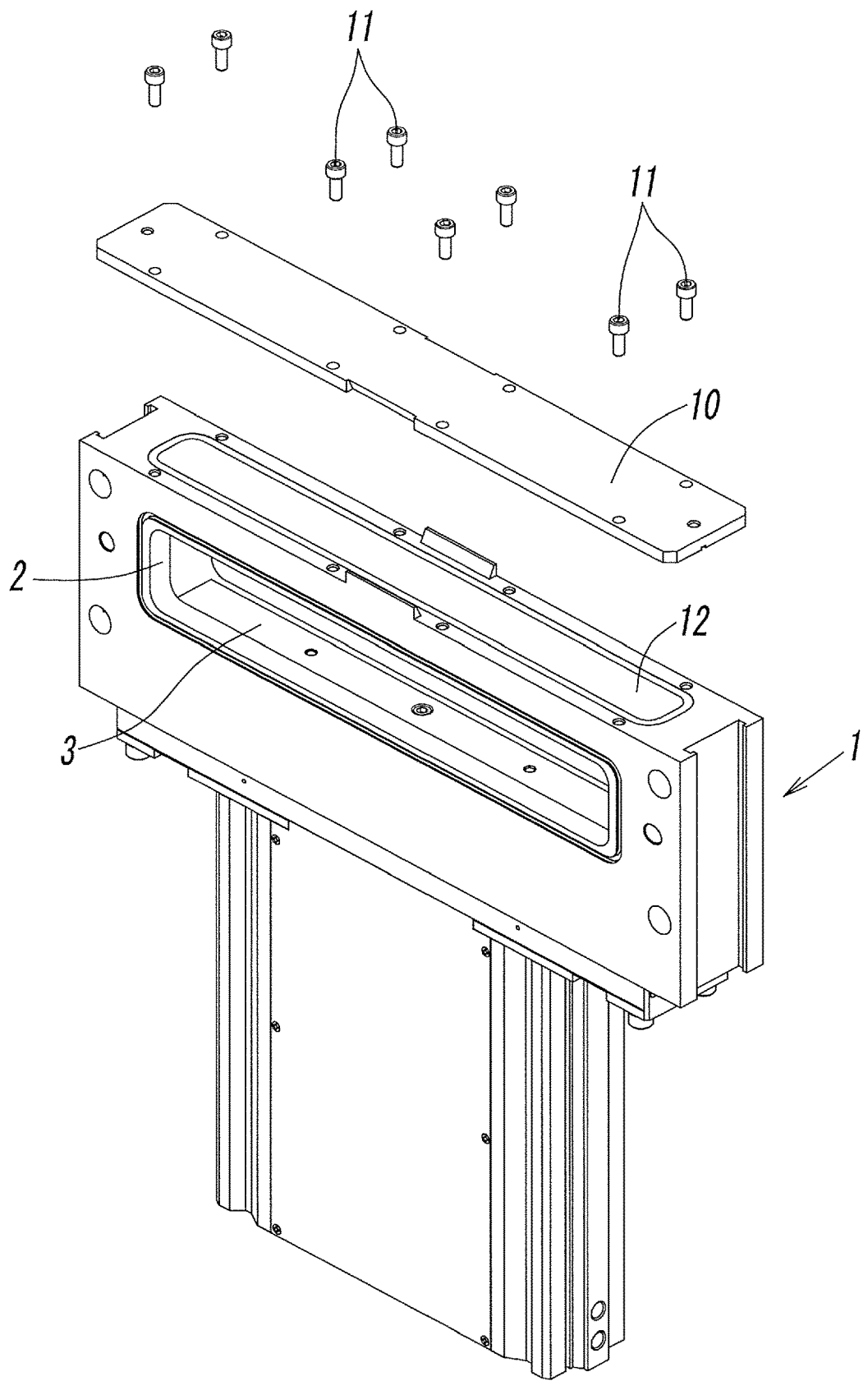
FIG. 11 is a perspective view illustrating the gate valve in a state in which a lid is removed from an upper surface of the valve box.
Figure 12:
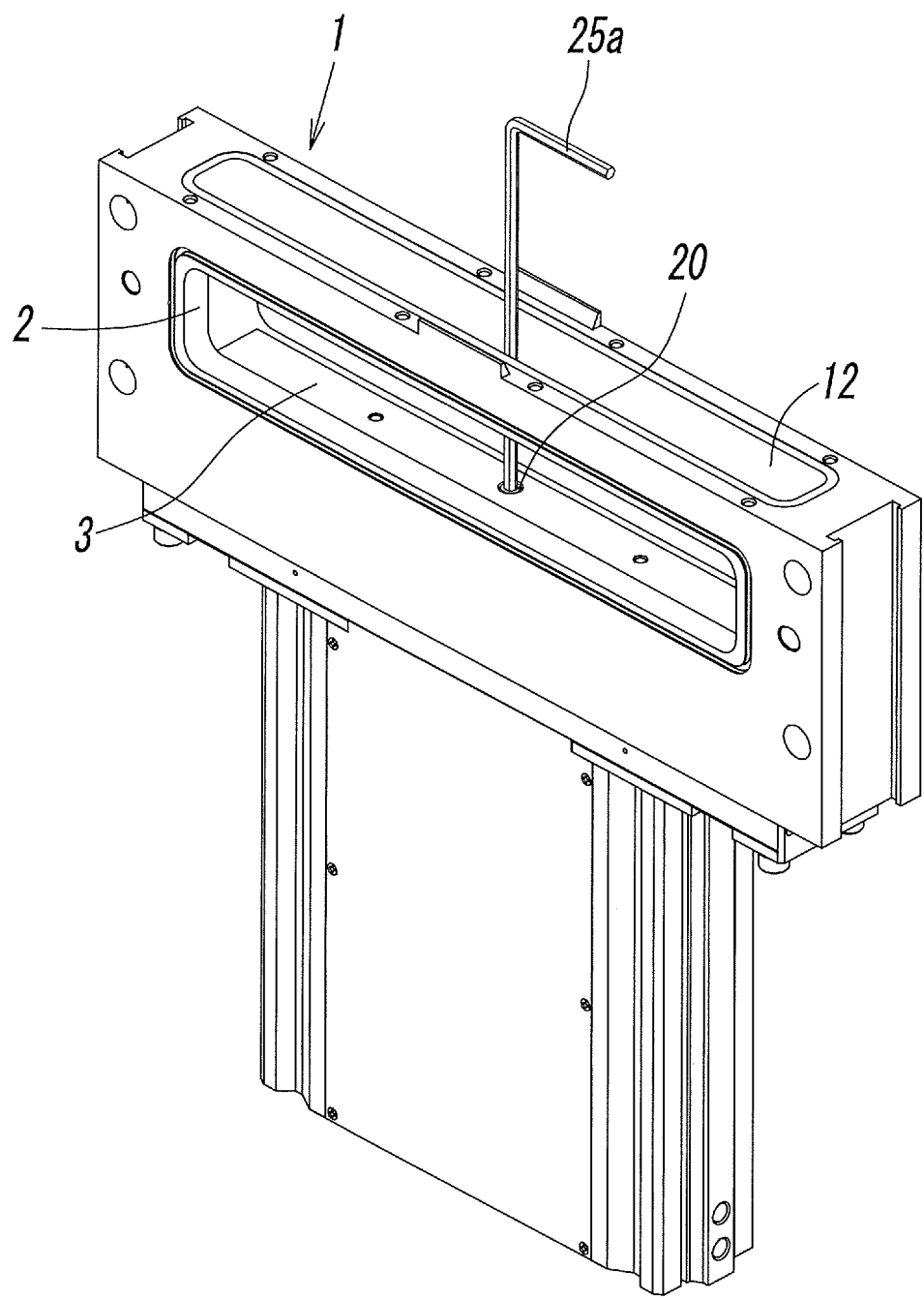
FIG. 12 is a perspective view illustrating the gate valve in a state in which a valve-plate fixation screw that joins the valve plate and the valve rod together is being loosened.
Figure 13:
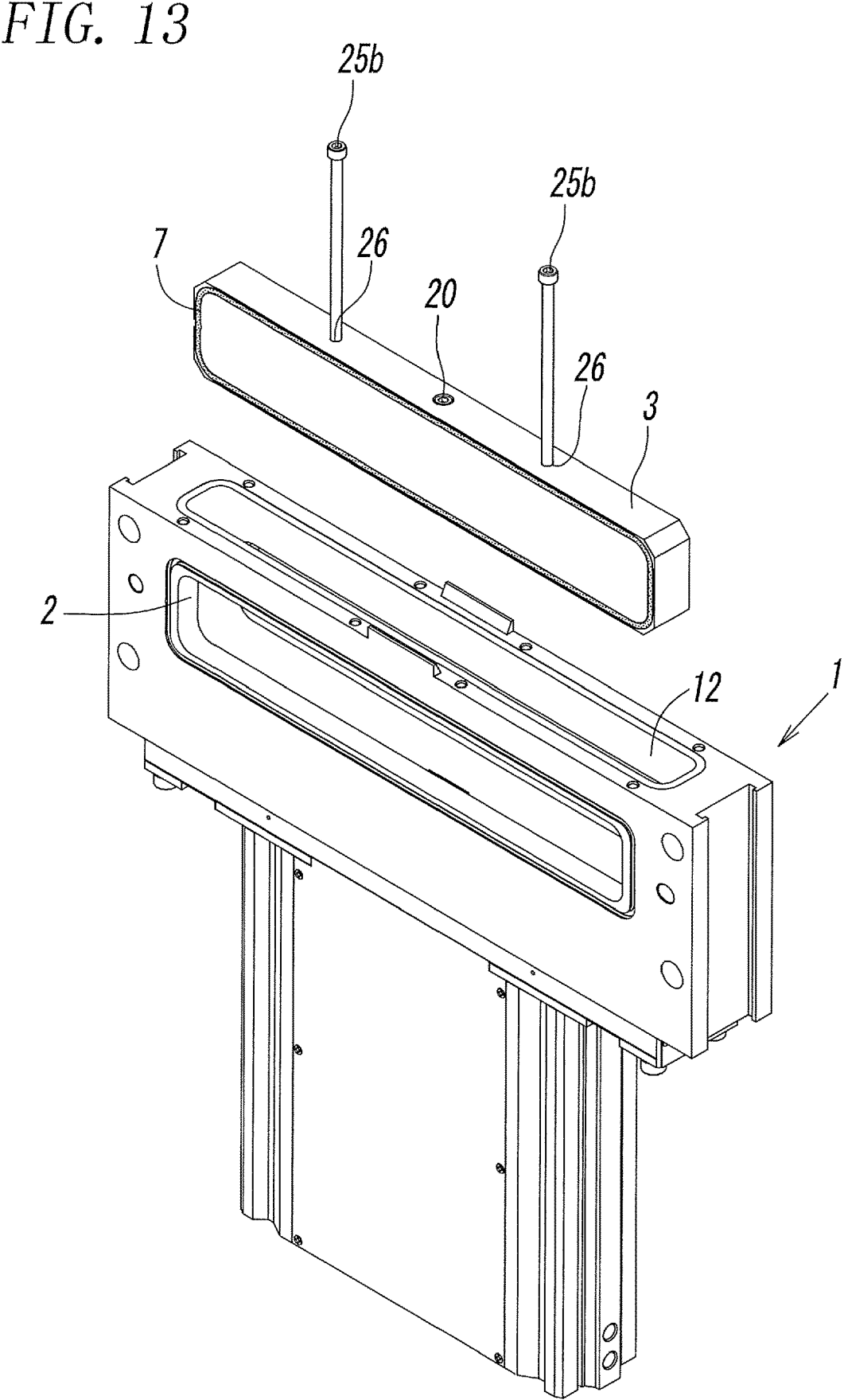
FIG. 13 is a perspective view illustrating the gate valve in a state in which the valve plate is taken out of the valve box.

As illustrated in FIGS. 10 and 11, a lid 10 is detachably attached to the upper surface of the valve box 1 with lid fixation screws 11. Removing the lid 10 opens the valve box 1 at the upper surface. As illustrated in FIGS. 12 and 13, the valve plate 3 can be detached from the valve rod 4 and taken out of the valve box 1 through a window 12, which is the opening at the upper surface.

Regarding a second gate opening d that is formed in a rear side wall 1c of the valve box 1 as illustrated in FIG. 2, when the valve plate 3 is at the retracted position, this gate opening 1d and the first gate opening 2 together serve as a passage in the valve box through which things such as works are taken into or out of the vacuum chamber. Note that the gate opening 1d is not the gate that the valve plate 3 opens or closes directly.

As illustrated in FIGS. 2 to 5, the valve plate 3 has a rectangular and tabular shape elongated laterally and is made of aluminum integrally. The valve plate 3 includes a valve front surface 3a to which the sealing member 7 is attached, a valve rear surface 3b that is opposite to the valve front surface 3a, a valve upper surface 3c, and a valve lower surface 3d. A mounting hole 13 opens at the valve lower surface 3d. The valve front surface 3a, the valve rear surface 3b, the valve upper surface 3c, and the valve lower surface 3d are flat surfaces.

The valve rod 4 has a mounting portion 14 at the end of the valve rod 4 in the direction of the axis L1 (the upper end in the figures). The mounting portion 14 is to be inserted into and fixed to the mounting hole 13. The mounting hole 13 has a cross-sectional shape elongated in the longitudinal direction of the valve plate 3 (in the right-left direction in the figures). In addition, the mounting hole 13 is defined by a front hole-wall surface 13a positioned near the valve front surface 3a, a rear hole-wall surface 13b positioned near the valve rear surface 3b, and right and left side hole-wall surfaces 13c, and a hole end surface 13d positioned at the end of the mounting hole 13 in the depth direction.

Figure 4:
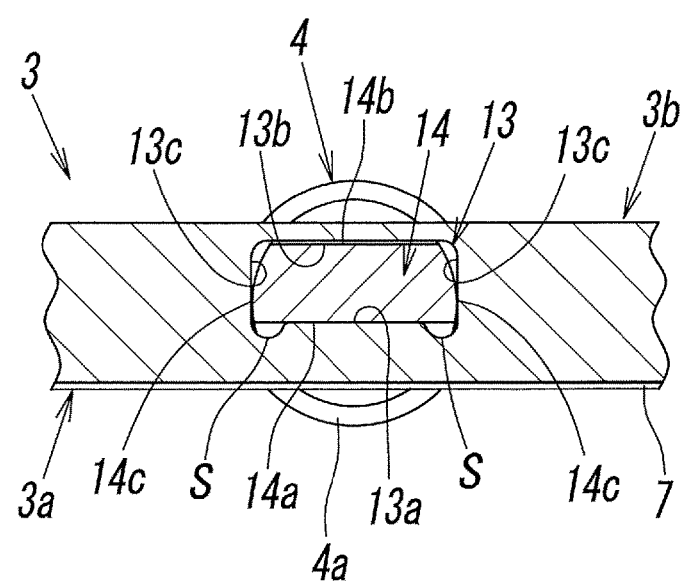
FIG. 4 is an enlarged cross-sectional view illustrating part of the valve plate taken along line B-B' in FIG. 3.
Figure 5:
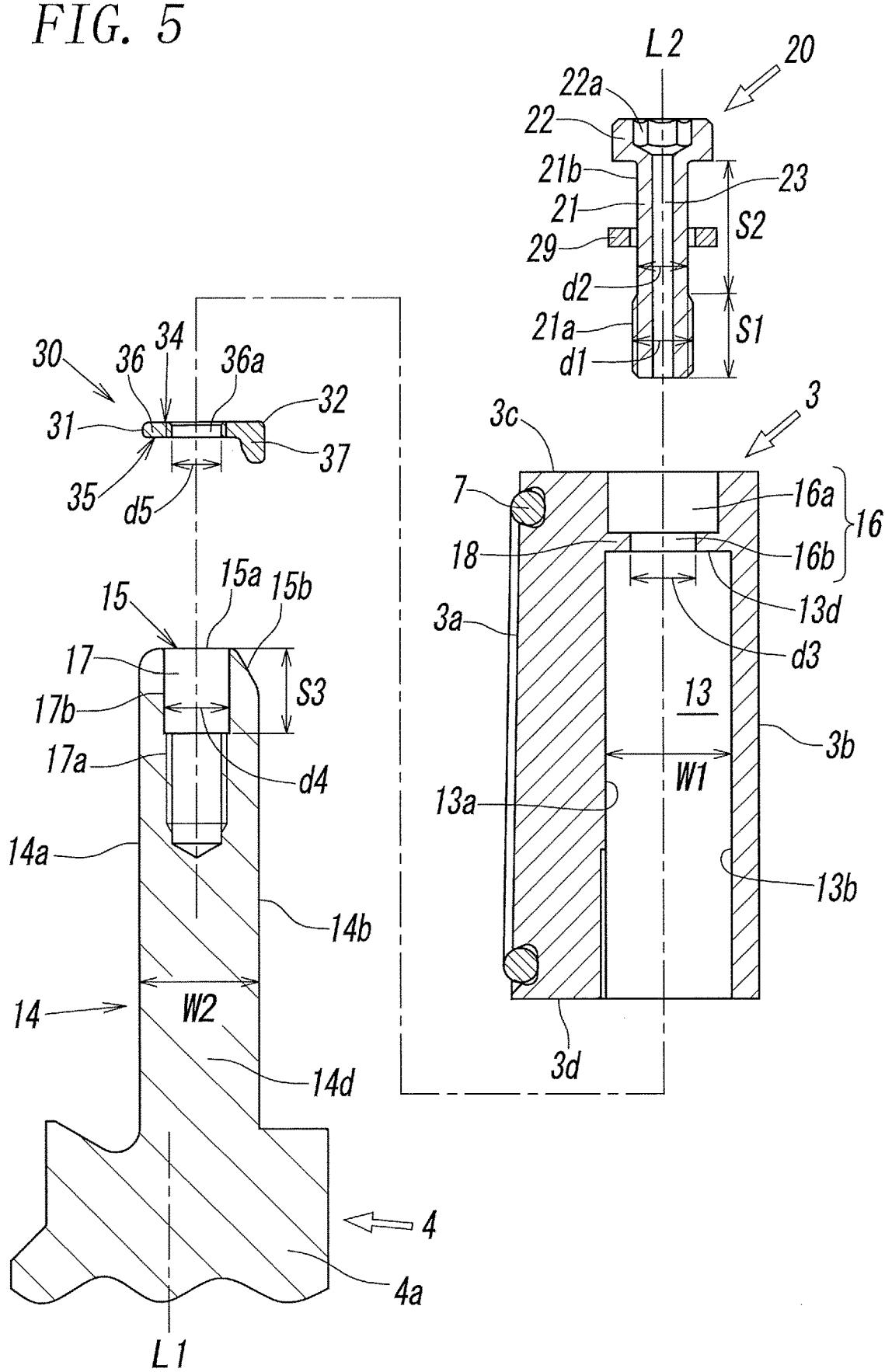
FIG. 5 is a cross-sectional view in which the valve plate, a valve rod, a valve-plate fixation screw, and a spacer are illustrated separately.
Figure 6:
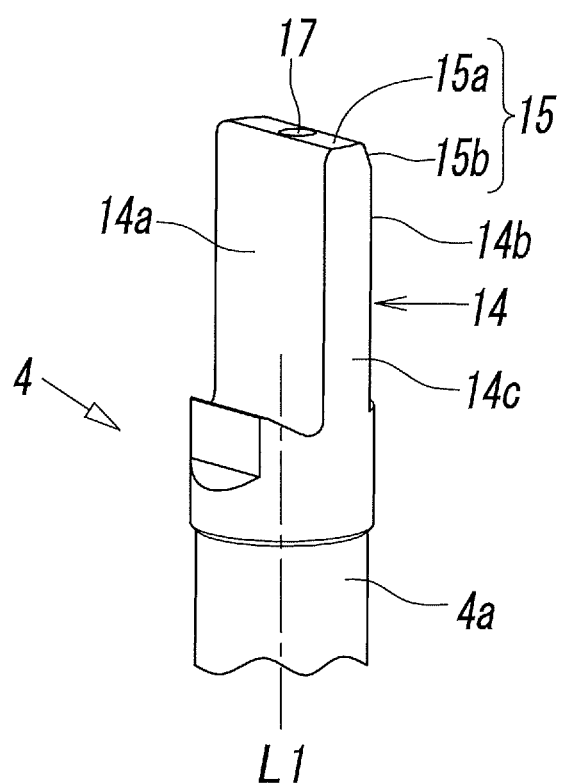
FIG. 6 is a perspective view illustrating a mounting portion of the valve rod.
Figure 7A:
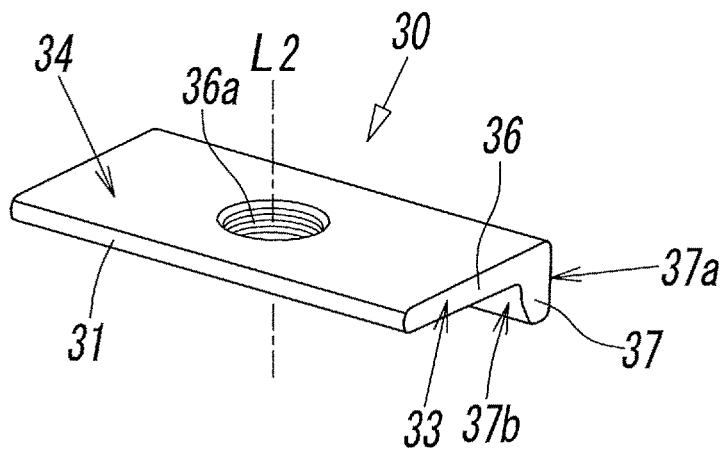
FIG. 7A is a perspective view of a spacer.
Figure 7B:
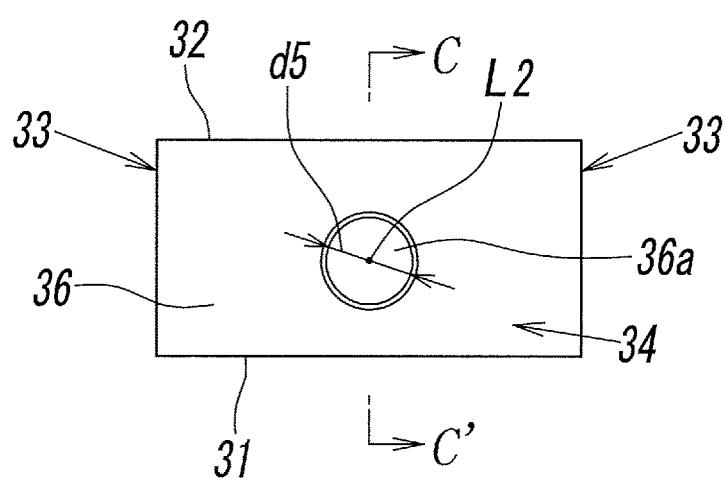
FIG. 7B is a plan view of the spacer.
Figure 7C:
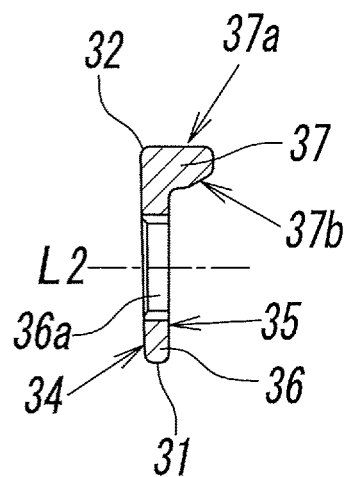
FIG. 7C is a cross-sectional view of the spacer taken along line C-C' in FIG. 7B.
Figure 7D:
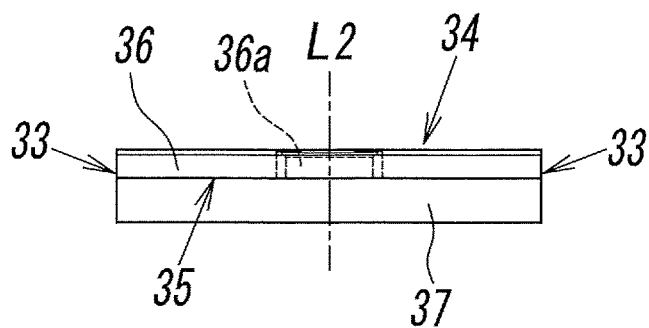
FIG. 7D is a front view of the spacer.
Figure 7E:
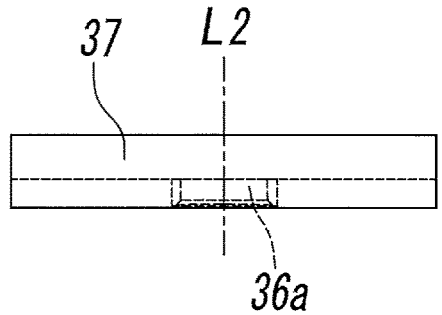
FIG. 7E is a rear view of the spacer.

The front hole-wall surface 13a and the rear hole-wall surface 13b are flat surfaces formed parallel to each other, and the side hole-wall surfaces 13c are also flat surfaces formed parallel to each other. The hole end surface 13d is a flat surface orthogonally intersecting the front and rear hole-wall surfaces 13a and 13b and the side hole-wall surfaces 13c. In addition, the mounting hole 13 is formed such that the distance between the front hole-wall surface 13a and the valve front surface 3a is greater than the distance between the rear hole-wall surface 13b and the valve rear surface 3b. As illustrated in FIG. 4, grooves S are formed respectively at the right and left ends of the front hole-wall surface 13a so as to extend along the axis L1. The grooves S are formed only for the purpose of machining the mounting hole 13 in the valve plate 3, of which a detailed description is omitted here.

The valve rod 4 is made of a stainless steel. As illustrated in FIGS. 2 to 6, the valve rod 4 has the mounting portion 14 formed at the end of a column-like main body 4a of the valve rod 4. The mounting portion 14 is to be inserted into the mounting hole 13. The mounting portion 14 is shaped like a column that is cut by two parallel flat surfaces along the axis L1 of the valve rod 4. In other words, the valve rod 4 has a rod front surface 14a that opposes and abuts the front hole-wall surface 13a of the mounting hole 13, a rod rear surface 14b that opposes the rear hole-wall surface 13b of the mounting hole 13, and right and left rod side surfaces 14c that oppose respective right and left side hole-wall surfaces 13c of the mounting hole 13. The valve rod 4 also has a rod end surface 15 that serves as the end surface of the mounting portion 14 (in other words, the end surface of the valve rod 4) in the direction of the axis L1.

In other words, the rod front surface 14a and the rod rear surface 14b are flat surfaces extending parallel to each other along the axis L1, and the rod side surfaces 14c are convex surfaces protruding arcuately outward. The rod end surface 15 includes an uninclined surface portion 15a and an inclined surface portion 15b. The uninclined surface portion 15a extends from the front edge connected to the rod front surface 14a toward the rod rear surface 14b. The inclined surface portion 15b extends from the rear edge of the uninclined surface portion 15a and declines toward a base end portion 14d of the mounting portion 14 in such a manner that the width of the mounting portion 14 in the front-rear direction increases gradually.

The uninclined surface portion 15a extends horizontally so as to orthogonally intersect the axis L1 and a central axis L2 (to be described later). The inclined surface portion 15b is formed as a flat surface and the rear edge thereof is connected to the rod rear surface 14b. The angle between the uninclined surface portion 15a and the inclined surface portion 15b is an obtuse angle, and preferably approximately 120 degrees.

The mounting hole 13 and the mounting portion 14 are formed such that a distance W1 between the front hole-wall surface 13a and the rear hole-wall surface 13b is slightly greater than a distance W2 between the rod front surface 14a and the rod rear surface 14b. In addition, as described above, the mounting hole 13 and the mounting portion 14 are formed such that in the state of the valve plate 3 attached to the valve rod 4, the rod front surface 14a of the mounting portion 14 abuts the front hole-wall surface 13a of the mounting hole 13. Accordingly, in the state of the valve plate 3 attached to the valve rod 4, a small space G1 is formed between the rod rear surface 14b and the rear hole-wall surface 13b. The width of the space G1 is the difference between W1 and W2 (see FIGS. 2, 8, and 9). The length of the mounting portion 14 along the axis L1 is set to be greater than the depth of the mounting hole 13, in other words, greater than the distance between the valve lower surface 3d and the hole end surface 13d.

As illustrated in FIGS. 5 to 14, the valve plate 3 is attached to the end of the valve rod 4 with a valve-plate fixation screw 20 so as to be detachable in the direction of the axis L1 of the valve rod 4. For the purpose of mounting, a screw insertion hole 16 for receiving the valve-plate fixation screw 20 is formed at the valve upper surface 3c of the valve plate 3 on an central axis L2 that is parallel to the axis L1. On the central axis L2, a threaded hole 17 is also formed at the rod end surface 15 of the valve rod 4 so that the valve-plate fixation screw 20 can be screwed and engaged tightly with the threaded hole 17. In addition, in the present embodiment, a tabularly shaped spacer 30 is interposed between the hole end surface 13d of the mounting hole 13 and the rod end surface 15 of the mounting portion 14 in the state of the valve plate 3 being mounted onto the valve rod 4.

In the state of the valve plate 3 being mounted onto the valve rod 4, the central axis L2 is positioned behind the axis L1 of the valve rod 4 (i.e., closer to the rod rear surface 14b) and also behind the center between the valve front surface 3a and the valve rear surface 3b of the valve plate 3 (i.e., closer to the valve rear surface 3b). In addition, the central axis L2 is positioned in front of the center between the front hole-wall surface 13a and the rear hole-wall surface 13b of the mounting hole 13 (i.e., closer to the front hole-wall surface 13a) and also in front of the center between the rod front surface 14a and the rod rear surface 14b of the mounting portion 14 (i.e., closer to the rod front surface 14a).

Moreover, the distance between the central axis L2 and the front hole-wall surface 13a is set to be equal to the distance between the central axis L2 and the rod front surface 14a. The mounting portion 14 is thereby positioned appropriately in the mounting hole 13 in the state of the rod front surface 14a abutting the front hole-wall surface 13a when the valve-plate fixation screw 20 is inserted through the screw insertion hole 16 of the valve plate 3 and screwed with the threaded hole 17 of the valve rod 4. Note that in the right-left direction, the central axis L2 is positioned at the center between a pair of side hole-wall surfaces 13c of the mounting hole 13 and also at the center between a pair of the rod side surfaces 14c of the mounting portion 14.

The valve-plate fixation screw 20 is formed of a screw body 21 around which an external thread is formed and of a manipulation-purpose screw head 22 connected to the base end of the screw body 21. The screw body 21 has an external thread portion 21a and a shaft 21b. The external thread portion 21a is formed near the end of the screw body 21 and has a thread formed on the circumferential surface thereof. The shaft 21b adjoins the external thread portion 21a and is positioned closer to the base end of the screw body 21 with respect to the external thread portion 21a. The shaft 21b is shaped like a column (no thread is formed on the circumferential surface). The base end of the shaft 21b is joined integrally to the lower surface of the screw head 22. A manipulation-purpose hexagon socket 22a opens at the upper surface of the screw head 22. A hexagonal wrench 25a is inserted in the hexagon socket 22a for manipulation of the valve-plate fixation screw 20.

In addition, an air hole 23 is formed through the valve-plate fixation screw 20 between the bottom of the manipulation-purpose hexagon socket 22a and the end surface of the screw body 21. Air in the threaded hole 17 can be thereby discharged through the air hole 23 when the valve-plate fixation screw is screwed with the threaded hole 17.

The outside diameter of the screw head 22 is made greater than the outside diameter d1 of the external thread portion 21a (the diameter of a cylinder virtually formed by connecting ridges of the thread) and is also made greater than the diameter d2 of the shaft 21b. In addition, the outside diameter d1 of the external thread portion 21a is made greater than the diameter d2 of the shaft 21b. The length S1 of the external thread portion 21a is made smaller than the length S2 of the shaft 21b in the direction of the central axis L2.

The screw insertion hole 16 is penetrated through the valve plate 3 between the valve upper surface 3c and the hole end surface 13d of the mounting hole 13. The screw insertion hole 16 has a large diameter section 16a that opens at the valve upper surface 3c so as to accommodate the screw head 22 of the valve-plate fixation screw 20. The screw insertion hole 16 also has a small diameter section 16b that is formed between the bottom of the large diameter section 16a and the hole end surface 13d so as to receive the screw body 21 of the valve-plate fixation screw 20 (in other words, the external thread portion 21a and the shaft 21b) inserted therethrough. An annular flange 18 is thereby formed in the valve plate 3 between the bottom of the large diameter section 16a and the hole end surface 13d.

The large diameter section 16a has such an inside diameter and a depth that the screw head 22 and an anti-loosening washer 29 can be completely accommodated together. The inside diameter d3 of the small diameter section 16b is made smaller than the inside diameter of the large diameter section 16a and also smaller than the outside diameter of the screw head 22 but is made greater than the outside diameter d1 of the external thread portion 21a of the valve-plate fixation screw 20 and also greater than the diameter d2 of the shaft 21b. In addition, the inside diameter of the large diameter section 16a is made slightly smaller than the distance W1 between the front hole-wall surface 13a and the rear hole-wall surface 13b and also slightly smaller than the distance W2 between the rod front surface 14a and the rod rear surface 14b.

The threaded hole 17 has an internal thread section 17a and a cylindrical section 17b. The internal thread section 17a has a thread formed on the inner peripheral surface of the threaded hole 17 and is screwed with the external thread portion 21a of the valve-plate fixation screw 20. The cylindrical section 17b has a circular cross section having a diameter d4 (in other words, no thread is formed on the inner peripheral surface). The cylindrical section 17b is formed so as to open at the uninclined surface portion 15a of the rod end surface 15 and so as to extend from the uninclined surface portion 15a to a length (depth) S3 along the central axis L2. The cylindrical section 17b adjoins the internal thread section 17a and is positioned on the side closer to the rod end surface 15.

The length S3 of the cylindrical section 17b (i.e., the distance between the uninclined surface portion 15a of the rod end surface 15 and the starting end of the internal thread section 17a) is set to be equal to or greater than the length S1 of the external thread portion 21a of the valve-plate fixation screw 20. In addition, the length of the internal thread section 17a in the direction of the central axis L2 is set to be greater than the length S1 of the external thread portion 21a. Accordingly, when the valve plate 3 is joined to (i.e., fixedly mounted on) the mounting portion 14 of the valve rod 4 and the external thread portion 21a of the valve-plate fixation screw 20 is screwed fixedly with the internal thread section 17a of the threaded hole 17, the entire external thread portion 21a is screwed with the internal thread section 17a.

The spacer 30 is made of stainless steel and formed integrally. As illustrated in FIGS. 5 to 9, the spacer 30 includes a front edge 31 positioned near the rod front surface 14a, a rear edge 32 positioned near the rod rear surface 14b, a pair of side edges 33 positioned near respective rod side surfaces 14c. As viewed in plan, the spacer 30 is shaped like a rectangle elongated in the right-left direction (in a direction parallel to the front edge 31 and to the rear edge 32). In other words, the front edge 31 and the rear edge 32 are formed parallel to each other, and a pair of the side edges 33 are also formed parallel to each other. The side edges 33 are formed at both ends of the front edge 31 and of the rear edge 32, and the angles between the side edges 33 and the front edge 31 and between the side edges 33 and the rear edge 32 are all right angles.

The spacer 30 has an upper surface 34 to abut the hole end surface 13d and a lower surface 35 to abut the rod end surface 15. The upper surface 34 and the lower surface 35 are flat surfaces. A through hole 36a is formed on the central axis L2 through the spacer 30 between the upper surface 34 and the lower surface 35. The screw body 21 of the valve-plate fixation screw 20 is inserted through the through hole 36a. Moreover, the spacer 30 has a flat plate portion 36 and an engagement protrusion 37. The flat plate portion 36 is formed in a front part of the spacer 30 so as to include the upper surface 34, the lower surface 35, and the front edge 31. The engagement protrusion 37 is formed at the rear end of the flat plate portion 36, in other words, formed in a rear end part of the spacer 30, so as to include the rear edge 32 and protrude downward.

The lower surface 35 forms a right angle with the central axis L2 and extends from the front edge 31 toward the rear edge 32 passing the through hole 36a. The upper surface 34 inclines slightly (preferably 3 degrees) such that the distance between the upper surface 34 and the lower surface 35 increases gradually from the front edge 31 toward the rear edge 32. The upper surface 34 extends from the front edge 31 toward the rear edge 32 passing the central axis L2 (preferably, passing the through hole 36a as in the present embodiment). Put another way, the flat plate portion 36 is formed into a wedge shape of which the thickness in the direction of the central axis L2 gradually increases from the front edge 31 toward the rear edge 32.

Figure 8:
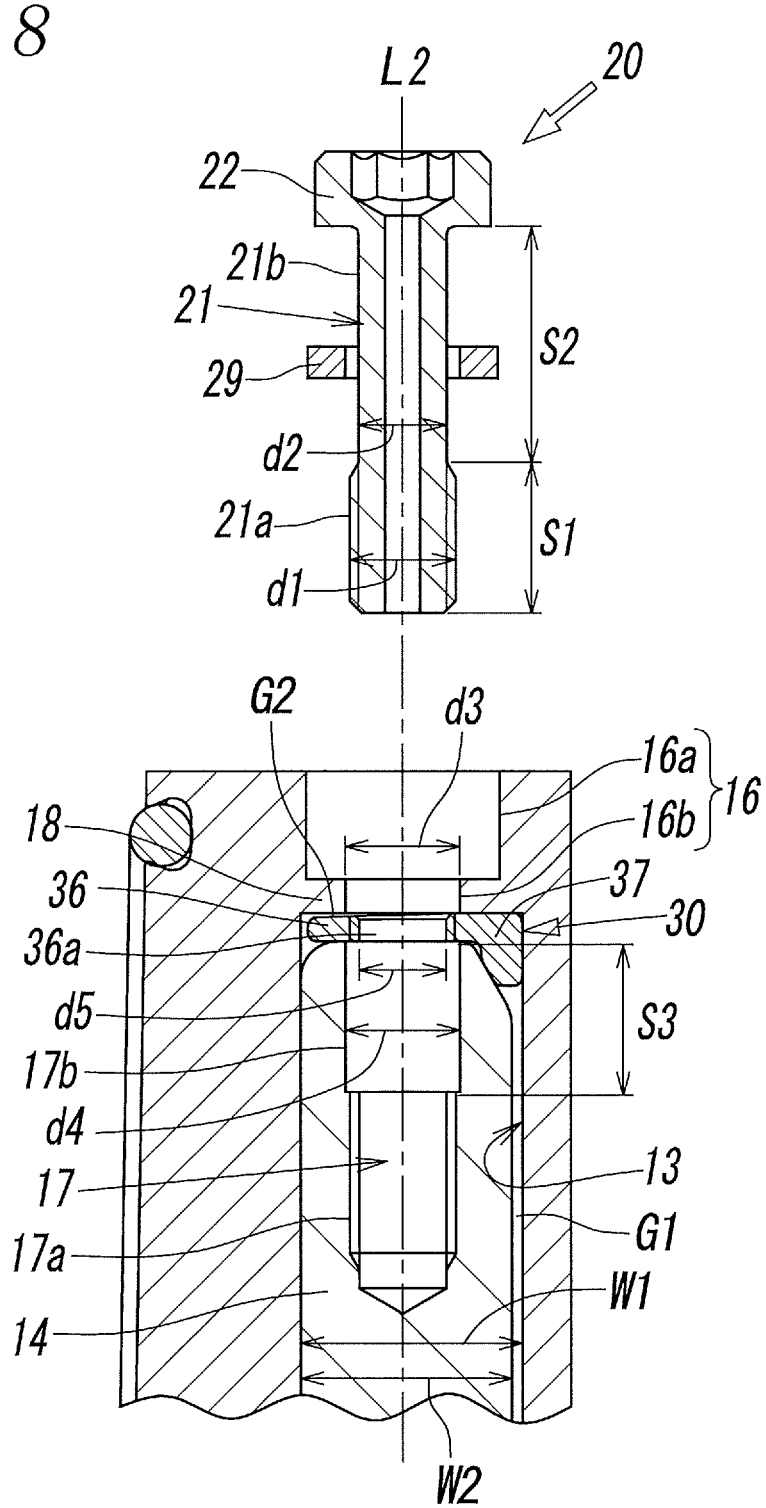
FIG. 8 is an enlarged partial cross-sectional view illustrating a state before the valve plate is fixed to the valve rod.

Accordingly, as illustrated in FIG. 8, in the state in which the mounting portion 14 of the valve rod 4 is inserted into the mounting hole 13 of the valve plate 3 until the rod end surface 15 abuts the hole end but the valve-plate fixation screw 20 is not screwed with the threaded hole 17, a horizontally elongated gap G2 is formed so as to open in the direction of the central axis L2 between the hole end surface 13d and the rod end surface 15 (preferably formed between the hole end surface 13d and the upper surface 34 of the spacer 30 as in the present embodiment). The gap G2 is formed like a wedge shape that opens near the rod front surface 14a and closes at a position near the rod rear surface 14b and behind the central axis L2 (preferably behind the through hole 36a of the spacer 30 as in the present embodiment).

Figure 9:
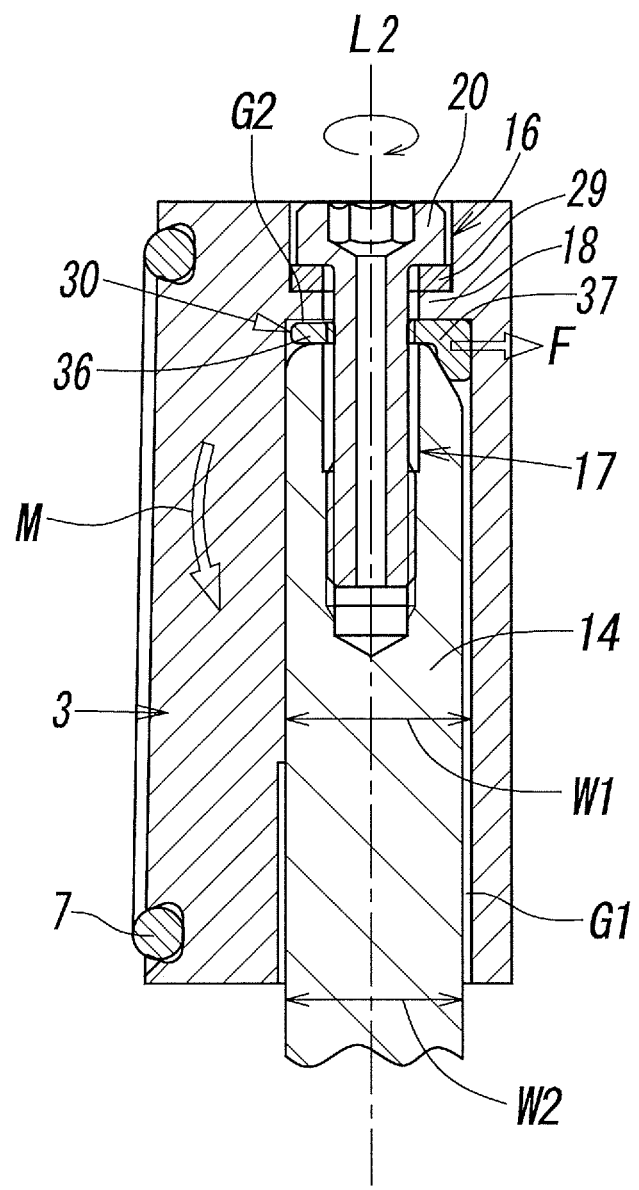
FIG. 9 is a partial cross-sectional view illustrating a state in which the valve plate is fixed to the valve rod.

When the valve plate 3 is fixedly mounted on (or joined to) the mounting portion 14 of the valve rod 4 and the valve-plate fixation screw 20 is screwed tightly with the threaded hole 17 of the mounting portion 14 as illustrated in FIG. 9, a fastening force acts on the flange 18 of the valve plate 3 so as to narrow the gap G2 and generate a moment M. The moment M causes the front hole-wall surface 13a of the valve plate 3 to press the rod front surface 14a of the valve rod 4.

Figure 14:
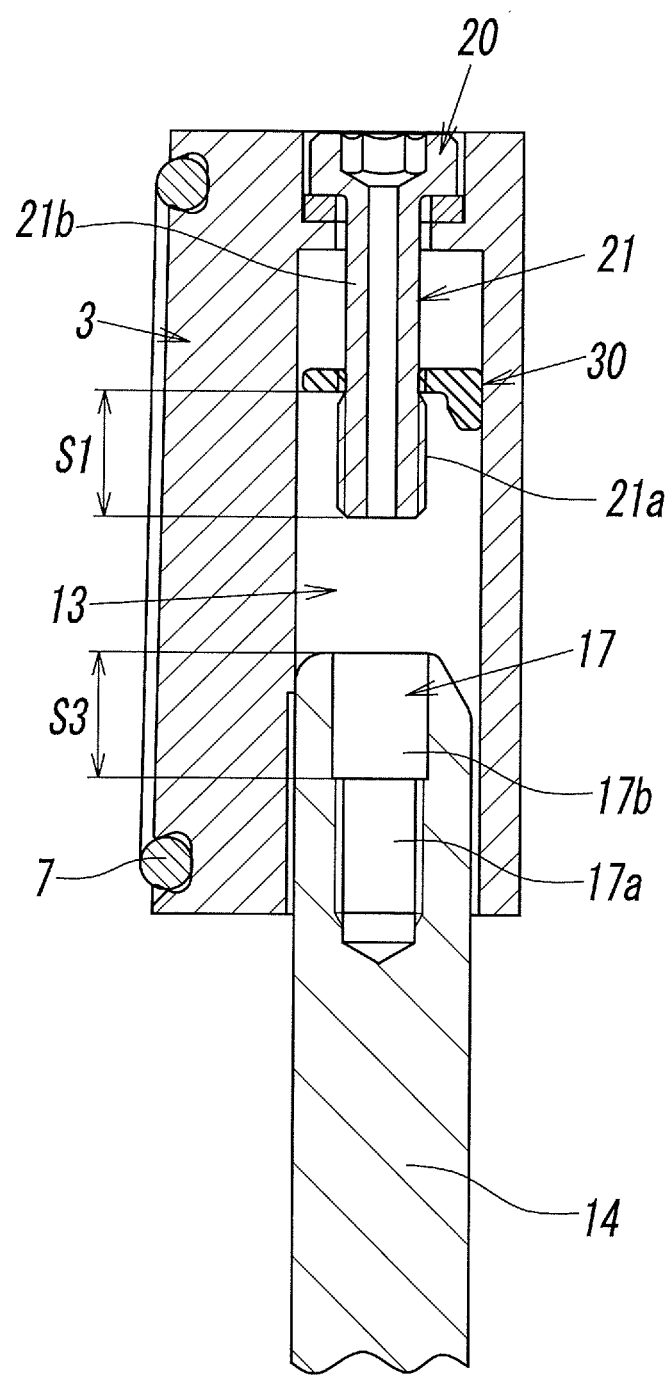
FIG. 14 is an enlarged partial cross-sectional view illustrating a state when the valve plate is detached from the valve rod.

In the present embodiment, a thread is formed on the inner peripheral surface of the through hole 36a in such a manner that the external thread portion 21a of the valve-plate fixation screw 20 can be screwed into and can pass through the through hole 36a. In addition, the inside diameter d5 of the through hole 36a (i.e., the diameter of a cylinder virtually formed by connecting ridges of the thread) is set to be smaller than the outside diameter d1 of the external thread portion 21a and slightly greater than the diameter d2 of the shaft 21b. As a result, as illustrated in FIG. 14, when the valve-plate fixation screw 20 is loosened for detaching the valve plate 3 from the valve rod 4, the spacer 30 remains on the shaft 21b without coming off the screw body 21 of the valve-plate fixation screw 20.

As illustrated in FIG. 7A to FIG. 7E, the engagement protrusion 37 has a first surface 37a and a second surface 37b. The first surface 37a is formed so as to extend vertically downward from the rear edge 32, whereas the second surface 37b is formed so as to extend obliquely downward from the rear end of the lower surface 35. The first surface 37a of the engagement protrusion 37 is brought into contact with the rear hole-wall surface 13b of the mounting hole 13, and the second surface 37b is brought into contact with the inclined surface portion 15b of the rod end surface 15.

The engagement protrusion 37 is disposed at a position closer than the through hole 36a to the rear edge 32 and formed into a wedge shape of which the width in the front-rear direction (i.e., the distance between the first surface 37a and the second surface 37b) gradually decreases toward the tip pointing downward. When the valve-plate fixation screw 20 is tightened against the threaded hole 17, the engagement protrusion 37 is pressed into the wedge-shaped space formed between the inclined surface portion 15b and the rear hole-wall surface 13b. As a result, the first surface 37a is pressed against the rear hole-wall surface 13b, and the second surface 37b is simultaneously pressed against the inclined surface portion 15b.

The first surface 37a is a flat surface that forms a right angle with the lower surface 35 (in other words, the first surface 37a is parallel to the central axis L2). The angle formed between the first surface 37a and the upper surface 34 is an acute angle, in other words, an angle slightly smaller than the right angle (preferably 87 degrees). The second surface 37b is a flat surface forming an obtuse angle, preferably 120 degrees, with the lower surface 35. The obtuse angle is set to be equal to the angle formed between the uninclined surface portion 15a and the inclined surface portion 15b of the rod end surface 15. The spacer 30 is formed such that the distance between the center of the through hole 36a (i.e., the central axis L2) and the first surface 37a (i.e., the rear edge 32) is set to be equal to the distance between the central axis L2 and the rear hole-wall surface 13b when the rod front surface 14a abuts the front hole-wall surface 13a.

The following describes a method of attaching and detaching the valve plate 3 to and from the valve rod 4 in the gate valve configured as described above with reference to FIGS. 8 to 14.

In an assembling process of mounting the valve plate 3 onto the valve rod 4 for the first time, as illustrated in FIG. 8, the spacer 30 is first inserted into the mounting hole 13 from the valve lower surface 3d of the valve plate 3 in such a manner that the front edge 31 of the spacer 30 opposes the front hole-wall surface 13a of the mounting hole 13, the rear edge 32 opposes the rear hole-wall surface 13b, and a pair of the side edges 33 oppose respective side hole-wall surfaces 13c. The spacer 30 is inserted further until the spacer 30 abuts the hole end surface 13d.

At this time, the mounting portion 14 of the valve rod 4 is also inserted into the mounting hole 13 from the valve lower surface 3d until the rod end surface 15 of the mounting portion 14 abuts the spacer 30 in the mounting hole 13. In this state, since the upper surface 34 of the spacer 30 inclines relative to the lower surface 35 thereof as described above, the wedge-shaped gap G2 is formed between the upper surface 34 and the hole end surface 13d so as to open near the rod front surface 14a and so as to close, due to the upper surface 34 abutting the hole end surface 13d, at a position closer to the rod rear surface 14b with respect to the central axis L2 (preferably with respect to the through hole 36a).

Next, the screw body 21 of the valve-plate fixation screw 20 is inserted into the screw insertion hole 16 of the valve plate 3 from the valve upper surface 3c until the end of external thread portion 21a of the screw body 21 reaches the through hole 36a of the spacer 30. Subsequently, the external thread portion 21a is screwed with the thread of the through hole 36a and turned further until the entire external thread portion 21a passes through the through hole 36a and is subsequently accommodated in the cylindrical section 17b of the threaded hole 17. As illustrated in FIG. 9, the external thread portion 21a is further screwed with the internal thread section 17a of the threaded hole 17 and tightened by applying a predetermined amount of torque. As a result, a pressing force of the screw head 22 acts on the flange 18 via the washer 29, and the valve plate 3 is thereby joined to the mounting portion 14 of the valve rod 4.

A fastening force of valve-plate fixation screw 20, in other words, the pressing force of the screw head 22 acts on the flange 18 of the valve plate 3 so as to narrow the gap G2. Here, the position at which the gap G2 closes in the front-rear direction (in other words, the position at which the hole end surface 13d presses the upper surface 34 of the spacer 30) is closer to the rod rear surface 14b with respect to the central axis L2 (preferably with respect to the through hole 36a). As illustrated in FIG. 9, this generates a counterclockwise moment M in the valve plate 3 with the center being positioned behind the central axis L2 (preferably behind the through hole 36a). The moment M slightly deforms the valve plate 3 so as to narrow the gap G2. As a result, the front hole-wall surface 13a, which is in contact with the rod front surface 14a, is pressed against the rod front surface 14a.

At the same time, the fastening force generated by tightening the valve-plate fixation screw 20 presses the lower surface 35 of the spacer 30 against the uninclined surface portion 15a of the rod end surface 15 and also presses the engagement protrusion 37 of the spacer 30 into the wedge-shaped space formed between the inclined surface portion 15b of the rod end surface 15 and the rear hole-wall surface 13b of the mounting hole 13. As a result, the first surface 37a of the spacer 30 is pressed against the rear hole-wall surface 13b and also the second surface 37b is pressed against the inclined surface portion 15b. Consequently, a backward pressing force F acts on the valve plate 3, which further presses the front hole-wall surface 13a of the valve plate 3 against the rod front surface 14a of the valve rod 4.

According to the present embodiment, the valve plate 3 can be fixed firmly and accurately to the valve rod 4 by using such a simple structure that the spacer 30 is interposed between the rod end surface 15 of the valve rod 4 and the hole end surface 13d of the valve plate 3 and also by using such a simple operation that the valve-plate fixation screw 20 is inserted through the screw insertion hole 16 of the valve plate 3 and screwed tightly with the threaded hole 17 of the valve rod 4. This can prevent particles from being generated due to the valve plate 3 and the valve rod 4 being rubbed against each other during gate valve operation.

When the valve plate 3 is detached from the valve rod 4 and taken out of the valve box 1 during a maintenance operation, for example, for replacing the sealing member 7 of the valve plate 3, the valve plate 3 is first moved down as illustrated in FIG. 10 by actuating the valve actuator 5 from an upper position (close position), which is indicated by the solid line in FIG. 2, to a lower position (retracted position), which is indicated by the dash-dot-dot line in FIG. 2.

Next, as illustrated in FIG. 11, the lid 10 is detached by removing the lid fixation screws 11 from the upper surface of the valve box 1 to open the window 12 at the upper surface.

Subsequently, as illustrated in FIG. 12, the valve-plate fixation screw 20 is loosened by using a hexagonal wrench 25a inserted through the window 12. The external thread portion 21a is thereby unscrewed from the internal thread section 17a of threaded hole 17 of the valve rod 4, and the entire external thread portion 21a is accommodated in the cylindrical section 17b.

Next, as illustrated in FIG. 13, two gripping tools 25b having external threads are screwed with respective tool insertion holes 26 having internal threads, and the valve plate 3 is pulled up with both hands holding the gripping tools 25b. This enables the valve plate 3 to be detached from the valve rod 4 and taken out through the window 12 opening at the upper surface of the valve box 1.

As described above, the inner peripheral surface of through hole 36a of the spacer 30 has the thread to be screwed with the external thread portion 21a of the valve-plate fixation screw 20, and the inside diameter d5 of the through hole 36a is made smaller than the outside diameter d1 of the external thread portion 21a. With this configuration, as illustrated in FIG. 14, the valve plate 3 can be detached from the valve rod 4 and taken out of the valve box 1 while the spacer 30 remains on the shaft 21b of the valve-plate fixation screw 20 without coming off the screw body 21 of the valve-plate fixation screw 20 and accordingly without coming off from the mounting hole 13 of the valve plate 3.

After the maintenance operation is completed, the valve plate 3 is returned to the valve box 1 by attaching the two gripping tools 25b again to the corresponding tool insertion holes 26 and by holding the gripping tools 25b by hand. The gripping tools 25b are removed after the mounting portion 14 of the valve rod 4 is inserted into the mounting hole 13 of the valve plate 3. The valve-plate fixation screw 20 is screwed with the threaded hole 17 and tightened by using the hexagonal wrench 25a. Thus, the valve plate 3 is fixed to the valve rod 4. Finally, the lid 10 is attached to the upper surface of the valve box 1 with the lid fixation screws 11. Thus, the gate valve becomes usable again in the state illustrated in FIG. 10.

The mounting structure for mounting the valve plate onto the valve rod in the gate valve according to the present invention as well as one embodiment of the gate valve having the mounting structure has been described in detail. In the present embodiment, however, the spacer 30 configured as described above is not necessarily provided between the rod end surface 15 and the hole end surface 13d in order to form the gap G2. For example, the gap G2 may be formed by the hole end surface 13d and the rod end surface 15 on which an inclined surface is formed. Moreover, in the present embodiment, one spacer generates both the moment M and the pressing force F as illustrated in FIG. 9, but the moment M and the pressing force F may be generated by separate members.

REFERENCE SIGNS LIST 1 valve box
1a side wall
1b valve seat
2 gate opening
3 valve plate
3a valve front surface
3b valve rear surface
3c valve upper surface
3d valve lower surface
4 valve rod
5 valve actuator
7 sealing member
10 lid
11 lid fixation screw
12 window
13 mounting hole
13a front hole-wall surface
13b rear hole-wall surface
13c side hole-wall surface
13d hole end surface
14 mounting portion
14a rod front surface
14b rod rear surface
14c rod side surface
14d base end portion
15 rod end surface
15a uninclined surface portion
15b inclined surface portion
16 screw insertion hole
16a large diameter section
16b small diameter section
17 threaded hole
17a internal thread section
17b cylindrical section
20 valve-plate fixation screw
21 screw body
21a external thread portion
21b shaft
22 screw head
30 spacer
31 front edge
32 rear edge
33 side edge
34 upper surface
35 lower surface
36 flat plate portion
36a through hole
37 engagement protrusion
37a first surface
37b second surface
W1 distance between front hole-wall surface 13a and rear hole-wall surface 13b
W2 distance between rod front surface 14a and rod rear surface 14b
G1 space
G2 gap
L1 axis
L2 central axis
d1 outside diameter of external thread portion 21a
d2 diameter of shaft 21b
d3 inside diameter of small diameter section 16b
d4 inside diameter of cylindrical section 17b
d5 inside diameter of through hole 36a
S1 length of external thread portion 21a
S2 length of shaft 21b
S3 length of cylindrical section 17b

The invention claimed is:

1. A gate valve, comprising:
a valve rod that extends in an up-down direction and is accommodated in a valve box; and
a valve plate attached to an end of the valve rod, the valve plate opens and closes a gate opening formed in a side wall of the valve box, wherein
the valve plate includes a valve front surface to which a seal configured to come into contact with and be separated from a valve seat disposed around the gate opening is attached, a valve rear surface positioned on a side opposite to the valve front surface, a valve upper surface, and a valve lower surface,
the valve plate has a mounting hole that is formed in the valve lower surface and into which a mounting portion formed at the end of the valve rod is to be inserted,
the valve plate has a screw insertion hole that penetrates the valve plate between the valve upper surface and the mounting hole and through which a valve-plate fixation screw is to be inserted,
the valve plate is attached to the valve rod by the valve-plate fixation screw,
the mounting hole is defined by a front hole-wall surface positioned near the valve front surface, a rear hole-wall surface positioned near the valve rear surface, and a hole end surface that is a bottom surface of the mounting hole,
the screw insertion hole opens at the hole end surface,
the mounting portion of the valve rod has a rod front surface that opposes the front hole-wall surface of the mounting hole, a rod rear surface that opposes the rear hole-wall surface of the mounting hole, and a rod end surface positioned at an end of the mounting portion,
the rod end surface has a threaded hole formed so as to be screwed with the valve-plate fixation screw to be inserted through the screw insertion hole of the valve plate,
in a state in which the mounting portion of the valve rod is inserted into the mounting hole of the valve plate until the rod end surface abuts a hole end and in a state in which the valve-plate fixation screw is not screwed with the threaded hole, a horizontally elongated gap is formed between the hole end surface of the mounting hole and the rod end surface of the valve rod, and the gap opens at a position closer to the rod front surface of the mounting portion and closes at a position near the rod rear surface with respect to a central axis of the threaded hole,
the front hole-wall surface of the valve plate is configured to press the rod front surface of the valve rod by tightening the valve-plate fixation screw when the valve-plate fixation screw is screwed with the threaded hole,
a spacer is provided between the hole end surface of the mounting hole and the rod end surface of the mounting portion,
the spacer has an upper surface to abut the hole end surface and a lower surface to abut the rod end surface and also has a through hole that is formed between the upper surface and the lower surface and through which the valve-plate fixation screw is inserted, the gap is formed between the upper surface of the spacer and the hole end surface of the mounting hole, and the gap opens at a position near the rod front surface of the mounting portion and closes at a position closer to the rod rear surface with respect to the through hole when the upper surface of the spacer abuts the hole end surface of the mounting hole.

2. The gate valve according to claim 1,
wherein the gap is shaped like a wedge in such a manner that an opening width of the gap in the up-down direction is gradually narrowed from the rod front surface toward the rod rear surface.

3. The gate valve according to claim 1, wherein
the upper surface and the lower surface of the spacer are flat surfaces, the spacer has a flat plate portion between the upper surface and the lower surface, a front edge near the rod front surface, and a rear edge near the rod rear surface, the flat plate portion is shaped like a wedge in such a manner that a thickness between the upper surface and the lower surface gradually increases from the front edge toward the rear edge, and the gap is shaped like a wedge in such a manner that the gap gradually becomes narrower from the front edge toward the rear edge.

4. The gate valve according to claim 3, wherein
the spacer has an engagement protrusion formed at the rear edge so as to protrude downward, the engagement protrusion has a first surface extending downward from the rear edge and a second surface extending downward from a rear end of the lower surface, the engagement protrusion is shaped like a wedge in such a manner that a width of the engagement protrusion in a front-rear direction gradually decreases toward a lower end thereof, the rod end surface of the mounting portion includes
an uninclined surface portion that extends from a front edge of the mounting portion toward a rear edge thereof so as to orthogonally intersects the central axis, and an inclined surface portion that extends from a rear end of the uninclined surface portion toward a base end of the mounting portion and declines such that a width of the mounting portion in the front-rear direction increases gradually, and in the state in which the valve-plate fixation screw is screwed tightly with the threaded hole and the valve plate is thereby fixedly mounted on the mounting portion of the valve rod, the engagement protrusion of the spacer is pressed in between the rear hole-wall surface of the mounting hole and the inclined surface portion of the rod end surface, which causes the first surface of the engagement protrusion to press the rear hole-wall surface and also causes the second surface of the engagement protrusion to press the inclined surface portion.

5. The gate valve according to claim 4, wherein
in the spacer, the first surface of the engagement protrusion forms an acute angle with the upper surface of the flat plate portion and also forms a right angle with the lower surface of the flat plate portion.

6. The gate valve according to claim 1, wherein
the valve-plate fixation screw has a screw body to be screwed with the threaded hole and a manipulation-purpose screw head connected to a base end of the screw body, the screw body has an external thread portion having a thread formed on a circumferential surface thereof and a column-like shaft formed closer to the base end of the screw body with respect to the external thread portion, the threaded hole is formed of an internal thread section in which a thread to be screwed with the external thread portion is formed on an inner peripheral surface of the threaded hole and also formed of a cylindrical section that has a circular cross section and is positioned closer to the rod end surface with respect to the internal thread section, a thread to be screwed with the external thread portion of the valve-plate fixation screw is formed on an inner peripheral surface of the through hole of the spacer, and in a direction of the central axis, a length of the external thread portion of the valve-plate fixation screw is made shorter than a length of the cylindrical section of the threaded hole.

\* \* \* \* \*